US012319290B2

(12) United States Patent
Umezawa et al.

(10) Patent No.: US 12,319,290 B2
(45) Date of Patent: Jun. 3, 2025

(54) DRIVING ASSISTANCE APPARATUS FOR VEHICLE

(71) Applicant: SUBARU CORPORATION, Tokyo (JP)

(72) Inventors: Katsuyuki Umezawa, Tokyo (JP); Hiroaki Kuramochi, Tokyo (JP); Satoshi Nakano, Tokyo (JP); Masashi Okano, Tokyo (JP); Shuhei Dairokuno, Tokyo (JP); Motohiro Hidaka, Tokyo (JP); Tatsuro Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 89 days.

(21) Appl. No.: 18/224,248

(22) Filed: Jul. 20, 2023

(65) Prior Publication Data

US 2024/0034321 A1     Feb. 1, 2024

(30) Foreign Application Priority Data

Jul. 29, 2022    (JP) .................................. 2022-121719

(51) Int. Cl.
    *B60W 30/18*          (2012.01)

(52) U.S. Cl.
    CPC ... *B60W 30/18159* (2020.02); *B60W 2552/05* (2020.02)

(58) Field of Classification Search
None
See application file for complete search history.

(56) References Cited

U.S. PATENT DOCUMENTS

| | | | | |
|---|---|---|---|---|
| 2011/0040446 A1* | 2/2011 | Taguchi | ............... | B62D 15/025 701/41 |
| 2015/0274163 A1* | 10/2015 | Terazawa | .............. | B60W 10/20 701/41 |
| 2020/0180612 A1* | 6/2020 | Finelt | ................ | B60W 60/0027 |
| 2020/0292350 A1* | 9/2020 | Oe | ...................... | G01C 21/3647 |
| 2021/0271245 A1* | 9/2021 | Bradley | ................. | G05D 1/227 |

(Continued)

FOREIGN PATENT DOCUMENTS

JP      2021-160625 A     10/2021

*Primary Examiner* — Ryan Rink
(74) *Attorney, Agent, or Firm* — TROTUMAN PEPPER LOCKE LLP (57) ABSTRACT

A driving assistance apparatus for a vehicle includes: an environment information acquisitor that acquires environment information in front of the vehicle; a target route setter that sets a target route; and a controller that causes the vehicle to travel along the target route. The controller includes: an intersection determiner that determines whether there is an intersection in front of the vehicle; a right-left turn determiner that determines whether the vehicle turns right or left; a multiple intersecting road determiner that checks whether there is a second intersecting road; a route generator that generates a correct route and a quasi-correct route; an estimated traveling route setter that sets an estimated traveling route; a lateral position distance calculator that calculates a correct-route-side lateral position distance and a quasi-correct-route-side lateral position distance; a lateral position distance comparator that compares the lateral position distances; and an intervention controller that sets a traveling direction.

7 Claims, 9 Drawing Sheets

(56) References Cited

U.S. PATENT DOCUMENTS

| | | | |
|---|---|---|---|
| 2022/0065635 A1* | 3/2022 | Lee | B60W 60/0051 |
| 2023/0112601 A1* | 4/2023 | Nanri | B60W 30/12 701/1 |
| 2023/0294731 A1* | 9/2023 | Kudo | B60W 30/18009 701/23 |
| 2024/0034319 A1* | 2/2024 | Umezawa | B60W 60/001 |

\* cited by examiner

DRIVING ASSISTANCE APPARATUS FOR VEHICLE

CROSS-REFERENCE TO RELATED APPLICATION

The present application claims priority from Japanese Patent Application No. 2022-121719 filed on Jul. 29, 2022, the entire contents of which are hereby incorporated by reference.

BACKGROUND

The disclosure relates to a driving assistance apparatus for a vehicle configured to, when the vehicle turns (right turn or left turn) at an intersection of multiple intersecting roads and cannot make the turn to a first intersecting road of a turning destination, perform intervention control of causing the vehicle to travel in a direction of an adjacent second intersecting road.

In this type of driving assistance apparatus, when a driver (operator) who drives the vehicle sets a destination, a travel route from a current location to the destination is set on a road map, and driving of all or a part of the traveling route is assisted, or the driving is automatically performed instead of the driver. In driving assistance, a target route along which the vehicle travels is set on a travel route ahead of the vehicle. Then, a position where the vehicle is actually traveling is acquired from a sensing device or the like represented by a camera, a deviation amount of the vehicle position (vehicle lateral position) with respect to the target route is measured, and a steering angle is feedback-controlled so that the deviation amount converges to the target route (deviation amount=0).

In addition, in the driving assistance on an ordinary road, when the traveling route of the vehicle is set in a direction of turning (turning right or left) at an intersection, the control unit acquires road information (position information, lane width information, or the like) in the turning direction from the road map database. Then, the control unit sets a target route for turning at the intersection from the current vehicle based on the current position information (vehicle position information) of the vehicle before the intersection and the road information of a turning destination acquired from the road map database.

For example, Japanese Unexamined Patent Application Publication No. 2021-160625 discloses a technology in which a target route is set by coupling a center line set to a lane before an intersection on which a vehicle is traveling and a center line set to a lane to which a left turn is made with a clothoid curve set in the intersection, and the vehicle is caused to travel along the target route.

SUMMARY

An aspect of the disclosure provides a driving assistance apparatus for a vehicle. The driving assistance apparatus includes an environment information acquisitor, a target route setter, and a controller. The environment information acquisitor is configured to acquire environment information in front of the vehicle. The target route setter is configured to set a target route of the vehicle. The controller is configured to cause the vehicle to travel along the target route. The controller includes an intersection determiner, a right-left turn determiner, a multiple intersecting road determiner, a route generator, an estimated traveling route setter, a lateral position distance calculator, a lateral position distance comparator, and an intervention controller. The intersection determiner is configured to determine whether there is an intersection in front of the vehicle based on the environment information. The right-left turn determiner is configured to, when the intersection determiner determines that there is the intersection, determine whether the vehicle turns right or left at the intersection. The multiple intersecting road determiner is configured to, when the right-left turn determiner determines that the vehicle turns right or left, check whether there is a second intersecting road adjacent to a first intersecting road to which the vehicle turns right or left. The route generator is configured to, when the multiple intersecting road determiner determines that there is the second intersecting road, generate a correct route and a quasi-correct route at the intersection before the vehicle enters the intersection, the correct route being coupled to the target route generated in the first intersecting road, the quasi-correct route being coupled to the second intersecting road. The estimated traveling route setter is configured to set an estimated traveling route of the vehicle in the intersection based on a behavior of the vehicle. The lateral position distance calculator is configured to calculate a correct-route-side lateral position distance from the estimated traveling route se to the correct route in a vehicle width direction of the vehicle and a quasi-correct-route-side lateral position distance from the estimated traveling route to the quasi-correct route in the vehicle width direction. The lateral position distance comparator is configured to compare both the correct-route-side lateral position distance and the quasi-correct-route-side lateral position distance. The intervention controller is configured to, when the lateral position distance comparator determines that the correct-route-side lateral position distance is longer than the quasi-correct-route-side lateral position distance by a predetermined distance or more, set a traveling direction of the vehicle to a side of the quasi-correct route.

An aspect of the disclosure provides a driving assistance apparatus for a vehicle. The driving assistance apparatus includes circuitry. The circuitry is configured to acquire environment information in front of the vehicle. The circuitry is configured to set a target route of the vehicle and cause the vehicle to travel along the set target route. The circuitry is configured to: determine whether there is an intersection in front of the vehicle based on the acquired environment information; upon determining that there is the intersection, determine whether the vehicle turns right or left at the intersection; upon determining that the vehicle turns right or left, check whether there is a second intersecting road adjacent to a first intersecting road to which the vehicle turns right or left; upon determining that there is the second intersecting road, generate a correct route and a quasi-correct route at the intersection before the vehicle enters the intersection, the correct route being coupled to the target route generated in the first intersecting road, the quasi-correct route being coupled to the second intersecting road; set an estimated traveling route of the vehicle in the intersection based on a behavior of the vehicle; calculate a correct-route-side lateral position distance from the estimated traveling route to the correct route in a vehicle width direction of the vehicle and a quasi-correct-route-side lateral position distance from the estimated traveling route to the quasi-correct route in the vehicle width direction; compare the correct-route-side lateral position distance and the quasi-correct-route-side lateral position distance; and upon determining that the correct-route-side lateral position distance is longer than the quasi-correct-route-side lateral position distance by a predetermined distance or more, set a traveling direction of the vehicle to a side of the quasi-correct route.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technology related to driving assistance disclosed in the above-described document, the vehicle is caused to travel along the target route set at the intersection, but the curvature of the target route set in the intersection is relatively large, and thus the vehicle is caused to turn at a large steering angle. However, turning characteristics of the vehicle at the time of traveling are different for each vehicle type, and it is conceivable that the vehicle turns in a state of being clearly deviated from the target route depending on the vehicle. When the deviation amount from the target route is large, it is difficult to return to the target route in the intersection even if the steering angle is feedback-controlled.

Consequently, when the vehicle passes through the intersection and enters a lane of a turning destination, the vehicle greatly deviates from the target route and enters the lane, which disadvantageously impairs traveling stability. Therefore, when turning at the intersection, there is a limit to executing driving assistance for causing the vehicle to appropriately enter the lane of the turning destination only by conventional uniform feedback control on the target route.

It is desirable to provide a driving assistance apparatus for a vehicle capable of performing appropriate intervention control depending on an estimated traveling route in an intersection when turning at the intersection.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle M (FIGS. 8 to 10) is equipped with a driving assistance apparatus 1 for autonomously traveling in an automated driving section (a specific section of an expressway, a general road, or the like) without depending on the operation of the driver. The driving assistance apparatus 1 includes a locator unit 11 and a driving assistance control unit 21 as a controller. Furthermore, the locator unit 11 is provided with a map locator calculator 12 and a road map database 13.

Figure 1:
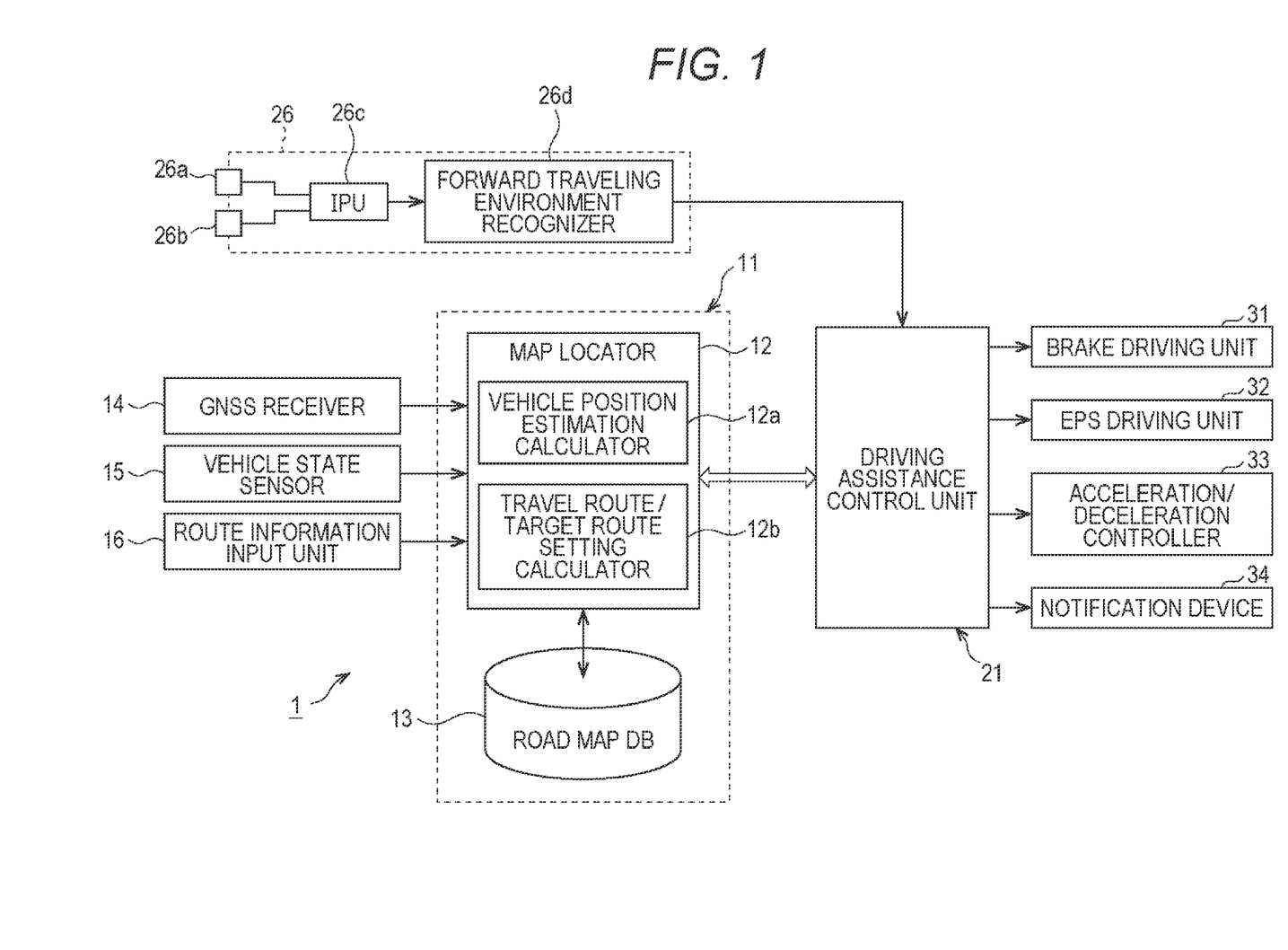
FIG. 1 is a schematic configuration diagram of a driving assistance apparatus.

The map locator calculator 12, the driving assistance control unit 21, and a forward traveling environment recognizer 26d provided in a camera unit 26 to be described later are configured by a microcontroller including a CPU, a RAM, a ROM, a rewritable nonvolatile memory (a flash memory or an EEPROM), and peripheral devices. The ROM stores programs, fixed data, and the like necessary for causing the CPU to execute each process. The RAM is provided as a work area of the CPU, and temporarily stores various data in the CPU. Note that the CPU is also called a microprocessor (MPU) or a processor. In addition, a graphics processing unit (GPU) or a graph streaming processor (GSP) may be used instead of the CPU. Alternatively, the CPU, the GPU, and the GSP may be selectively combined and used.

Furthermore, a global navigation satellite system (GNSS/global positioning satellite system) receiver 14, a vehicle state sensor 15, and a route information input unit 16 are coupled to an input side of the map locator calculator 12.

The vehicle state sensor 15 detects a traveling state of the vehicle M, and is a generic term for a vehicle speed sensor, a steering angle sensor, a yaw rate sensor, a longitudinal acceleration sensor, a turn signal switch, and the like.

The route information input unit 16 is a terminal device operated by an occupant (mainly the driver), and can receive a series of information such as a destination and a waypoint necessary for setting a traveling route in the map locator calculator 12. For example, the route information input unit 16 is an input unit (for example, a touch panel of a monitor) of a car navigation system, a mobile terminal such as a smartphone, a personal computer, or the like, and is coupled to the map locator calculator 12 in a wired or wireless manner.

When the occupant inputs information of a destination and a waypoint (facility name, address, telephone number, or the like) by operating the route information input unit 16, this input information is read by the map locator calculator 12. When a destination or a waypoint is input, the map locator calculator 12 sets position coordinates (latitude, longitude, and altitude) of the destination or the waypoint.

The map locator calculator 12 includes a vehicle position estimation calculator 12a that estimates the current vehicle position, and a travel route/target route setting calculator 12b as a target route setter that sets a travel route from the vehicle position to a destination (and a waypoint) and a target route for causing the vehicle M to perform automated traveling in an automated driving section (a specific section of an expressway, a general road, or the like).

The road map database 13 is a mass storage medium such as an HDD, and stores known high-precision road map information (local dynamic map). The high-precision road map information stores road data used for automated driving of the vehicle M.

The vehicle position estimation calculator 12a acquires current position coordinates (latitude, longitude, and altitude) of the vehicle M based on the positioning signal received by the GNSS receiver 14, and performs map matching of the position coordinates with high-precision road map information to estimate a vehicle position (current position) on the road map.

The travel route/target route setting calculator 12b refers to the high-precision road map information stored in the road map database 13 based on the position information (latitude, longitude, and altitude) of the vehicle position estimated by the vehicle position estimation calculator 12a and the position information (latitude, longitude, and altitude) of the input destination (and waypoint). The travel route/target route setting calculator 12b constructs a travel route coupling the vehicle position and the destination (if a waypoint is set, the destination via the waypoint) on the high-precision road map information according to preset route conditions (recommended route, fastest route, and the like).

Then, the travel route/target route setting calculator 12b sets a target route for causing the vehicle M to travel by automated driving up to several kilometers ahead of the vehicle M. The target route is set, for example, at the center of the lane on which the vehicle M travels (the center of left and right dividing lines).

The driving assistance apparatus 1 also includes the camera unit 26 that recognizes a traveling environment ahead of the vehicle M. The camera unit 26 is fixed to an upper center of a front part of the vehicle interior of the vehicle M, and includes an onboard camera (stereo camera) including a main camera 26a and a sub camera 26b disposed at symmetrical positions across the center in a vehicle width direction, an image processing unit (IPU) 26c, and a forward traveling environment recognizer 26d. In the camera unit 26, the main camera 26a captures reference image data, and the sub camera 26b captures comparison image data. Then, both the image data are subjected to predetermined image processing by the IPU 26c.

The forward traveling environment recognizer 26d reads the reference image data and the comparison image data subjected to the image processing by the IPU 26c, recognizes the same object in both images based on the parallax, calculates distance data (distance from the vehicle M to the object) using the principle of triangulation, and recognizes forward traveling environment information that is surrounding environment information of the front.

The forward traveling environment recognizer 26d of the camera unit 26 is coupled to the input side of the driving assistance control unit 21. Further, the driving assistance control unit 21 is coupled to the map locator calculator 12 via an in-vehicle communication line (for example, controller area network (CAN)) so as to be bidirectionally communicable.

On the other hand, a brake driving unit 31, an electric power steering (EPS) motor driver 32, an acceleration/deceleration controller 33, a notification device 34 such as a monitor or a speaker for notifying the driver of information for calling attention, and the like are coupled to an output side of the driving assistance control unit 21.

Here, the brake driving unit 31 decelerates the vehicle M to a predetermined speed by forced braking by driving a brake actuator (not illustrated) and adjusting brake fluid pressures supplied to wheel cylinders of respective brake calipers provided on the wheels. The EPS driving unit 32 drives an EPS motor provided in an electric power steering (EPS) device that is not illustrated to perform steering control of the vehicle M during traveling. The acceleration/deceleration controller 33 controls (engine braking or regenerative braking) a driving force of a driving source (an engine, an electric motor, or the like) and causes the vehicle speed during traveling to converge to a target vehicle speed by cooperative control with the brake driving unit 31.

Meanwhile, in the automated driving, the target route is basically set at the center of the travel lane. Accordingly, in the driving assistance control unit 21, the target route is set at the center of the travel lane of a first intersecting road Cr1, which is the destination of the turn, even when the vehicle turns (right turn or left turn) at the intersection by automated driving. Therefore, the driving assistance control unit 21 transmits a driving signal corresponding to the target steering angle at which the target route is traced to the EPS driving unit 32 (feedforward control).

In this case, the driving assistance control unit 21 calculates a steering angle correction amount that converges the deviation amount to the target route (deviation amount=0) from the deviation amount between the target route set by the map locator calculator 12 and the vehicle position (vehicle lateral position) estimated by the camera unit 26 or the vehicle position estimation calculator 12a. Then, the target steering angle is corrected by the steering angle correction amount (feedback control), and the EPS driving unit 32 is driven by the corrected target steering angle.

The feedback control has a certain delay time, and when the deviation amount is large, it is difficult to immediately converge the deviation amount with respect to the target route because traveling stability is impaired.

This feedback control is control for converging the deviation amount to the target route, and it is not determined whether the actual traveling route (vehicle traveling route) during the feedback control can make the turn to the first intersecting road Cr1 side. Therefore, when the correction by the feedback control is insufficient, it is conceivable that the vehicle traveling route enters the opposite lane side of the first intersecting road Cr1.

Figure 8:
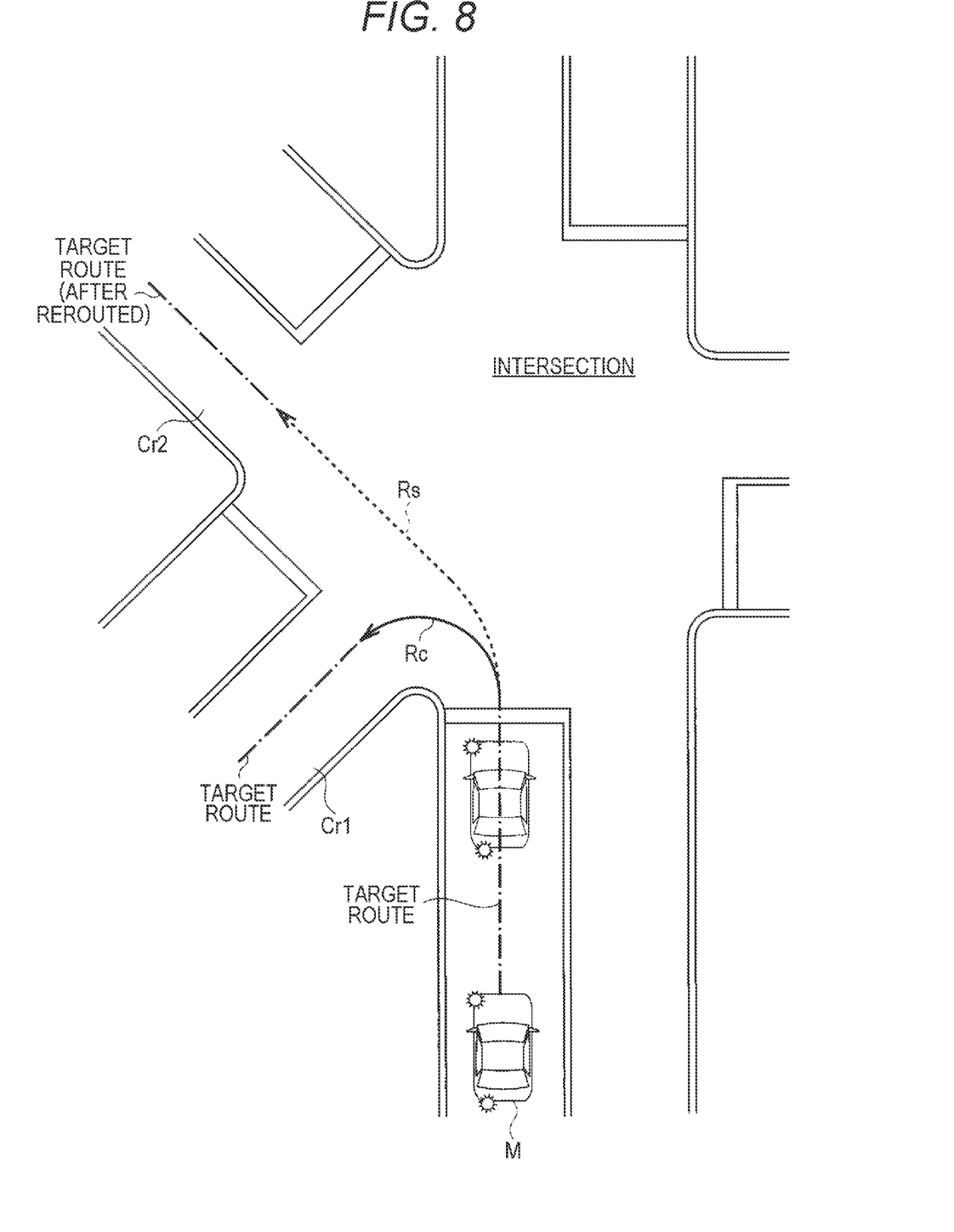
FIG. 8 is a diagram of a state in which a correct route and a quasi-correct route are generated when turning left at an intersection of multiple intersecting roads.

For example, at an intersection of multiple intersecting roads, an angle formed with an adjacent lane is often an acute angle. For example, the intersection illustrated in FIG. 8 is a five-way intersection, and the first intersecting road Cr1 that is going to turn left is coupled to the intersection at an acute angle with respect to the lane on which the vehicle M is traveling. Therefore, the driving assistance control unit 21 generates a target route with a large curvature in the intersection. When it is difficult to cause the vehicle M to travel along the target route with a large curvature generated at the intersection, the vehicle M cannot make the turn and enters the direction of the opposite lane.

The driving assistance control unit 21 according to the present embodiment generates a correct route Rc coupled to the first intersecting road Cr1 to which the vehicle M is about to turn in the intersection of multiple intersecting roads. Furthermore, the driving assistance control unit 21 generates a quasi-correct route Rs coupled to the second intersecting road Cr2 adjacent to the first intersecting road Cr1 to which the vehicle M is about to turn in the intersection.

When it is determined that the vehicle M cannot make the turn when turning in the direction of the first intersecting road Cr1 along the correct route Rc in the intersection, intervention control of guiding the vehicle M to the direction of the quasi-correct route Rs in which the traveling route is not set is executed.

Figure 2:
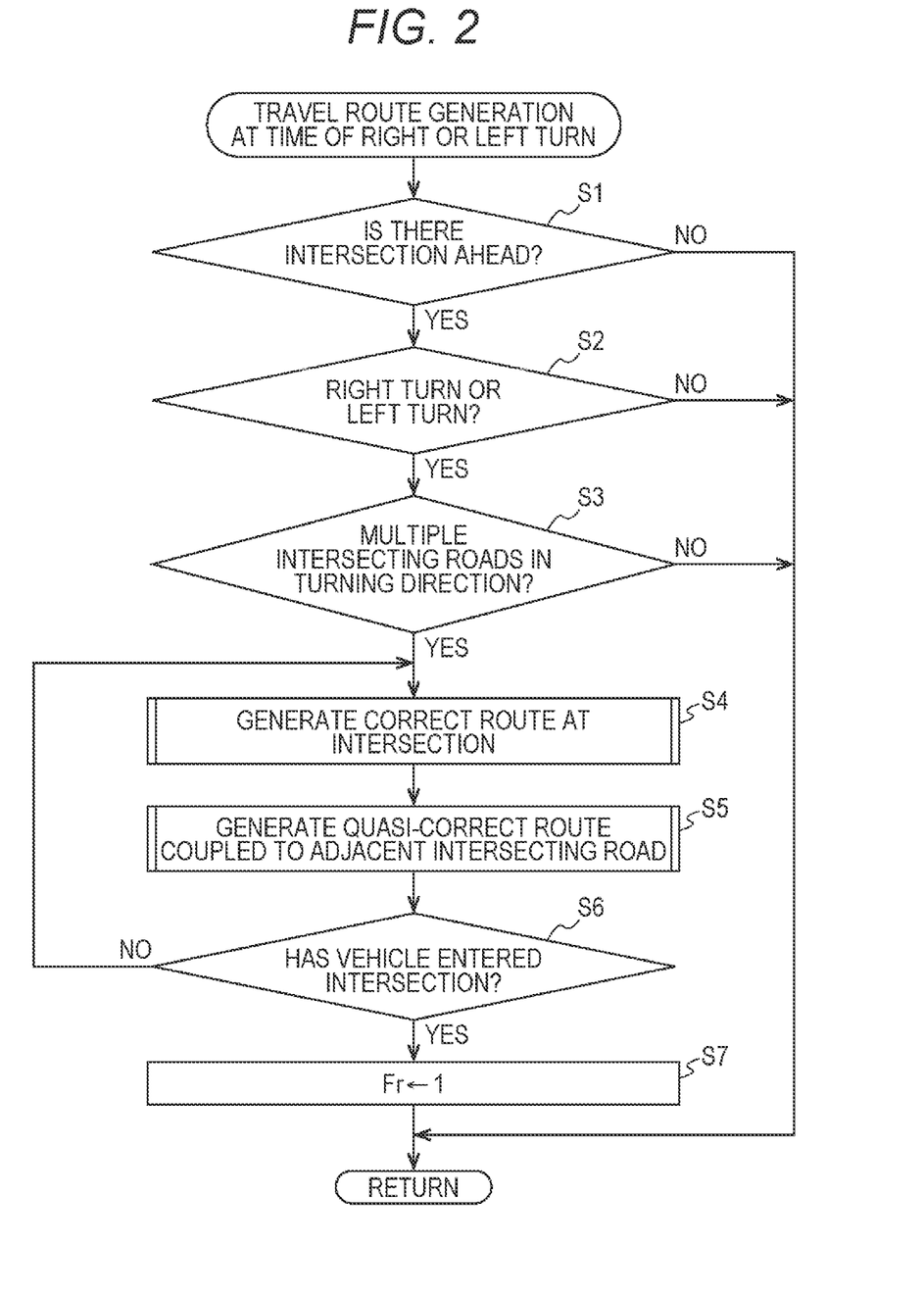
FIG. 2 is a flowchart illustrating a travel route generation routine at a time of turning right or left.

The route generation at the intersection of multiple intersecting roads executed by the driving assistance control unit 21 is performed according to, for example, a travel route generation routine at the time of turning right or left illustrated in FIG. 2. Further, the control of the traveling state depending on the vehicle position is performed according to, for example, an intervention control determination routine at a time of turning illustrated in FIGS. 5A and 5B. In the following, the routine illustrated in FIG. 2 will be described first, and the routines illustrated in FIGS. 5A and 4B will be described next.

In the routine illustrated in FIG. 2, first, in step S1, it is checked whether there is an intersection within a predetermined distance (for example, 200 (m)) in front of the vehicle M. Whether there is an intersection is acquired from, for example, the forward traveling environment information recognized by the forward traveling environment recognizer 26d of the camera unit 26, the high-precision road map information stored in the road map database 13, or road-to-vehicle communication. In one embodiment, the forward traveling environment recognizer 26d, the road map database 13, and the road-to-vehicle communication may serve as an "environment information acquisitor". In one embodiment, the process in step S1 may serve as a process performed by an "intersection determiner".

Then, when it is determined that there is an intersection, the process proceeds to step S2. On the other hand, when it is determined that there is no intersection, the routine is terminated.

Proceeding to step S2, the target route set by the travel route/target route setting calculator 12b of the map locator calculator 12 is read, and it is checked whether the target route is generated in a direction of turning at the intersection. Note that, even when the target route is set in a straight direction, it is determined that the driver has an intention of turning when the driver turns on the blinker switch before the intersection. At that time, the target route is rerouted in a direction in which the vehicle M turns. In one embodiment, the process in step S2 may serve as a process performed by a "right-left turn determiner".

Then, when the driving assistance control unit 21 determines that the target route is set in the direction of turning at the intersection, the process proceeds to step S3. On the other hand, when it is determined that the target route is set in the straight traveling direction, the routine is terminated.

Proceeding to step S3, it is checked whether there are multiple intersecting roads in the turning direction of the vehicle M. The multiple intersecting roads in the present embodiment refers to a state in which at least two intersecting roads exist in the turning direction with respect to the lane on which the vehicle M is traveling, and each of the intersecting roads faces the same intersection. For example, in FIG. 8, first and second intersecting roads Cr1 and Cr2 are coupled to the lane on which vehicle M is traveling in a direction in which the vehicle M is about to turn from the intersection (left turn in the drawing) by automated driving.

When it is determined in step S3 that there are multiple intersecting roads in the turning direction of the vehicle M, the process proceeds to step S4. On the other hand, when there is one intersecting road in the turning direction, the routine is terminated. In one embodiment, the process in step S3 may serve as a process performed by a "multiple intersecting road determiner".

Proceeding to step S4, a correct route is generated at the intersection. This correct route is generated according to the correct route generation subroutine illustrated in FIG. 3. In this subroutine, first, a target route is read in step S11. Next, the process proceeds to step S12, and the correct route Rc is generated in the intersection based on the target route. For example, it is generated by coupling an end point of the target route before entering the intersection and the target route of an intersection end point of a turning destination by a curvature between two points (see FIG. 8). Therefore, the target route generated in the intersection may be directly applied to the correct route Rc.

Figure 3:
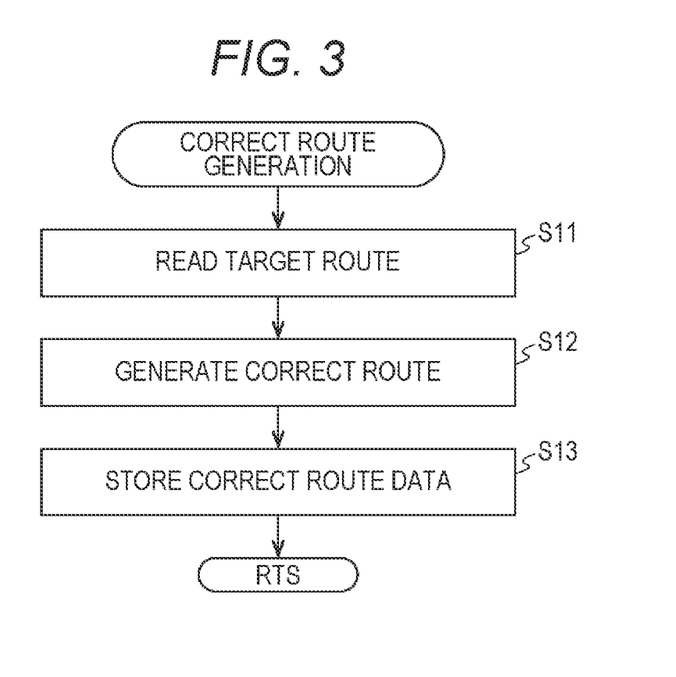
FIG. 3 is a flowchart illustrating a correct route generation subroutine.

Next, the process proceeds to step S13, data of the generated correct route Rc is stored in the nonvolatile memory, and the process proceeds to step S5 in FIG. 2.

In step S5 of FIG. 2, a quasi-correct route coupled to the second intersecting road Cr2 adjacent to the first intersecting road Cr1 to which the vehicle M is about to turn is generated in the intersection. This quasi-correct route is generated according to the quasi-correct route generation subroutine illustrated in FIG. 4.

Figure 4:
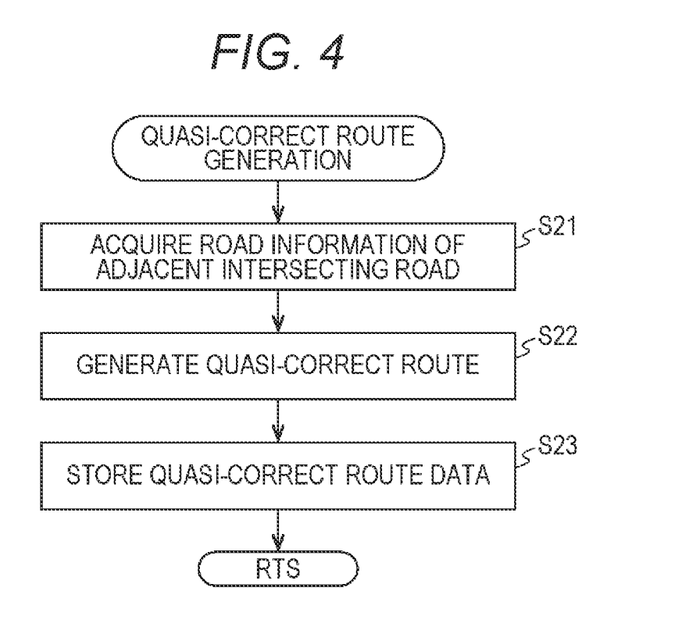
FIG. 4 is a flowchart illustrating a quasi-correct route generation subroutine.

In this subroutine, first, in step S21, road information of the second intersecting road CR2 adjacent to the first intersecting road Cr1 is acquired. This road information is acquired from, for example, the high-precision road map information stored in the road map database 13, or the road-to-vehicle communication, or the forward traveling environment information recognized by the camera unit 26. The information to be acquired includes a lane width of the travel lane of the second intersecting road Cr2, an intersection end point, and the like.

Next, the process proceeds to step S22, and the end point of the target route before entering the intersection and an extension line of the center of the lane width of the second intersecting road Cr2 are coupled by a curvature between two points, and a quasi-correct route Rs is generated in the intersection (see FIG. 8). Then, the process proceeds to step S23, the data of the generated quasi-correct route Rs is stored in the nonvolatile memory, and the process proceeds to step S6 in FIG. 2. In one embodiment, the process in steps S4 and S5 may serve as a process performed by a "route generator".

In step S6 of FIG. 2, it is checked whether the vehicle M has entered the intersection. and when the vehicle M is still before the intersection, the process returns to step S4, and the process in steps S4 and S5 is repeated. On the other hand, when it is determined that the vehicle has entered the intersection, the process proceeds to step S7, a route flag Fr is set (Fr←1), and the routine is terminated. The correct route data obtained in step S4 and the quasi-correct route data obtained in step S5 are sequentially rewritten until immediately before entering the intersection, and the latest data is stored. Note that the initial value of the route flag Fr is zero.

Figure 5A:
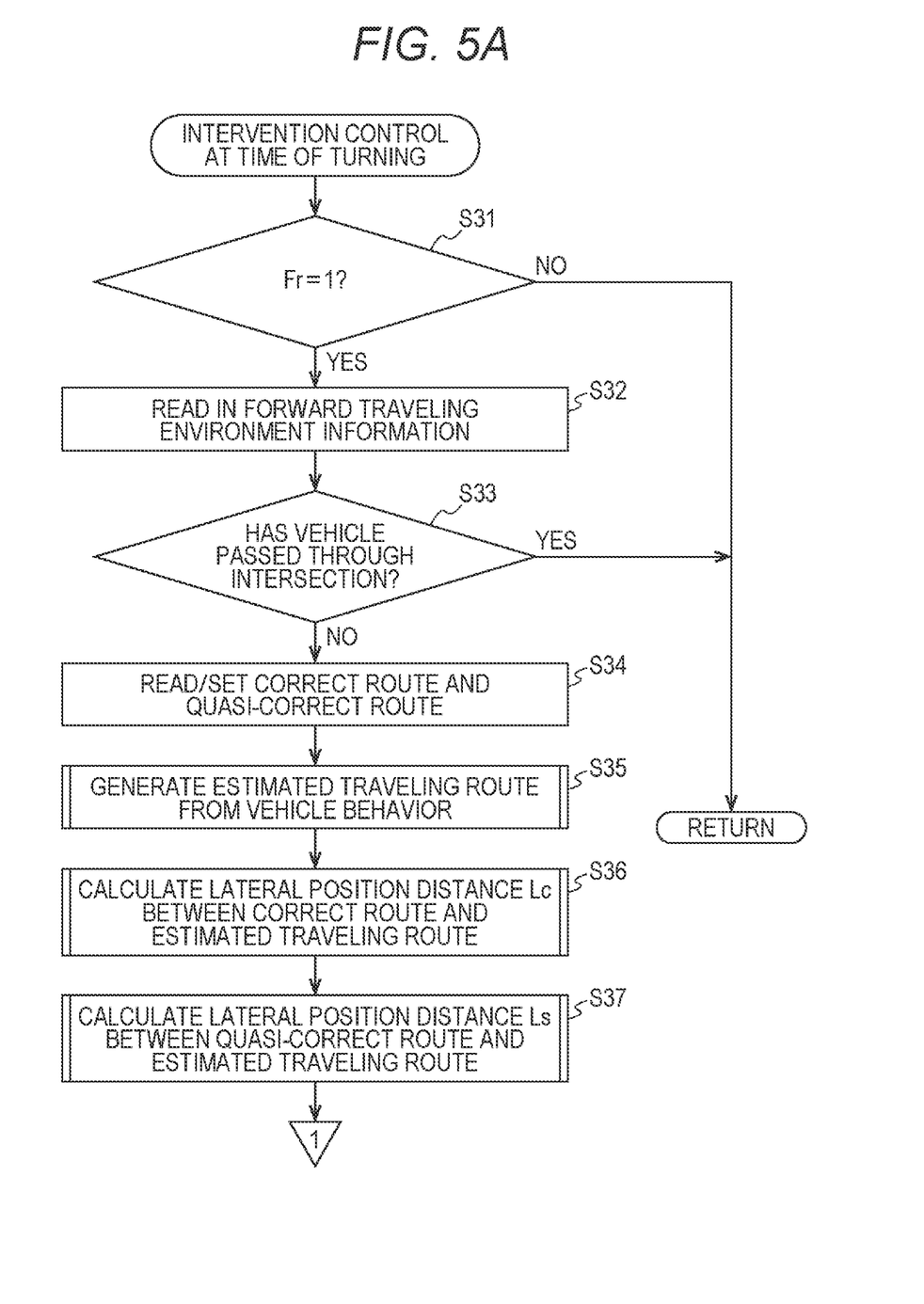
FIG. 5A is a flowchart (part 1) illustrating an intervention control determination routine at a time of turning.
Figure 5B:
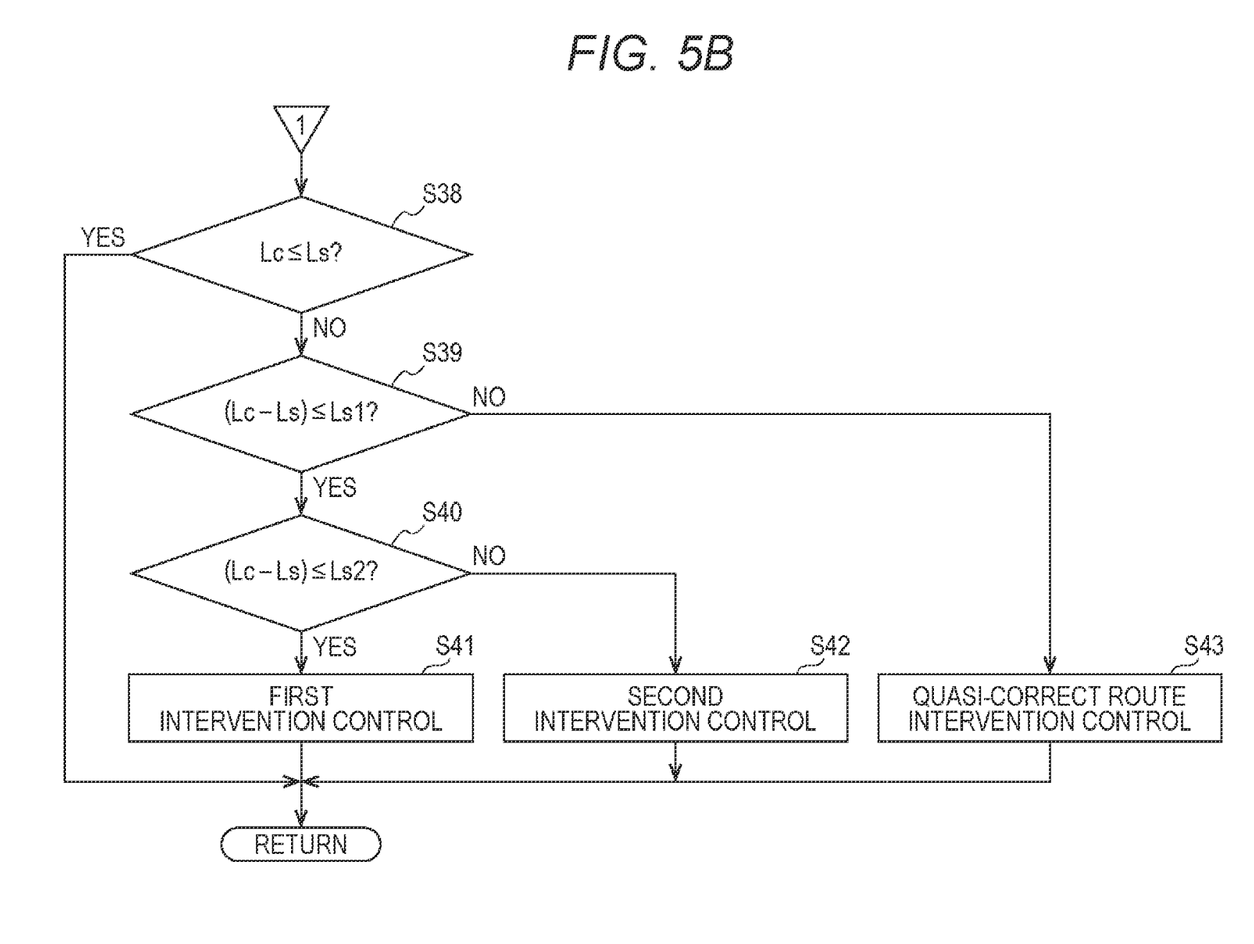
FIG. 5B is a flowchart (part 2) illustrating the intervention control determination routine at the time of turning.

The value of the route flag Fr and the data of the correct route Rc and the quasi-correct route Rs are read by the intervention control determination routine at the time of turning illustrated in FIGS. 5A and 5B.

In this routine, first, the value of the route flag Fr is read in step S31. Then, when Fr=0, it is determined that the vehicle M has not entered the intersection, and the routine is terminated. On the other hand, when Fr=1, it is determined that the vehicle M has entered the intersection, and the process proceeds to step S32.

In step S32, the forward traveling environment information of the vehicle M is read. The forward traveling environment information is acquired from the forward traveling environment information recognized by the forward traveling environment recognizer 26d of the camera unit 26. Alternatively, the forward traveling environment information may be acquired with reference to the high-precision road map information stored in the road map database 13 from the relationship between the target route set by the travel route/target route setting calculator 12b of the map locator calculator 12 and the current vehicle position.

Figure 9:
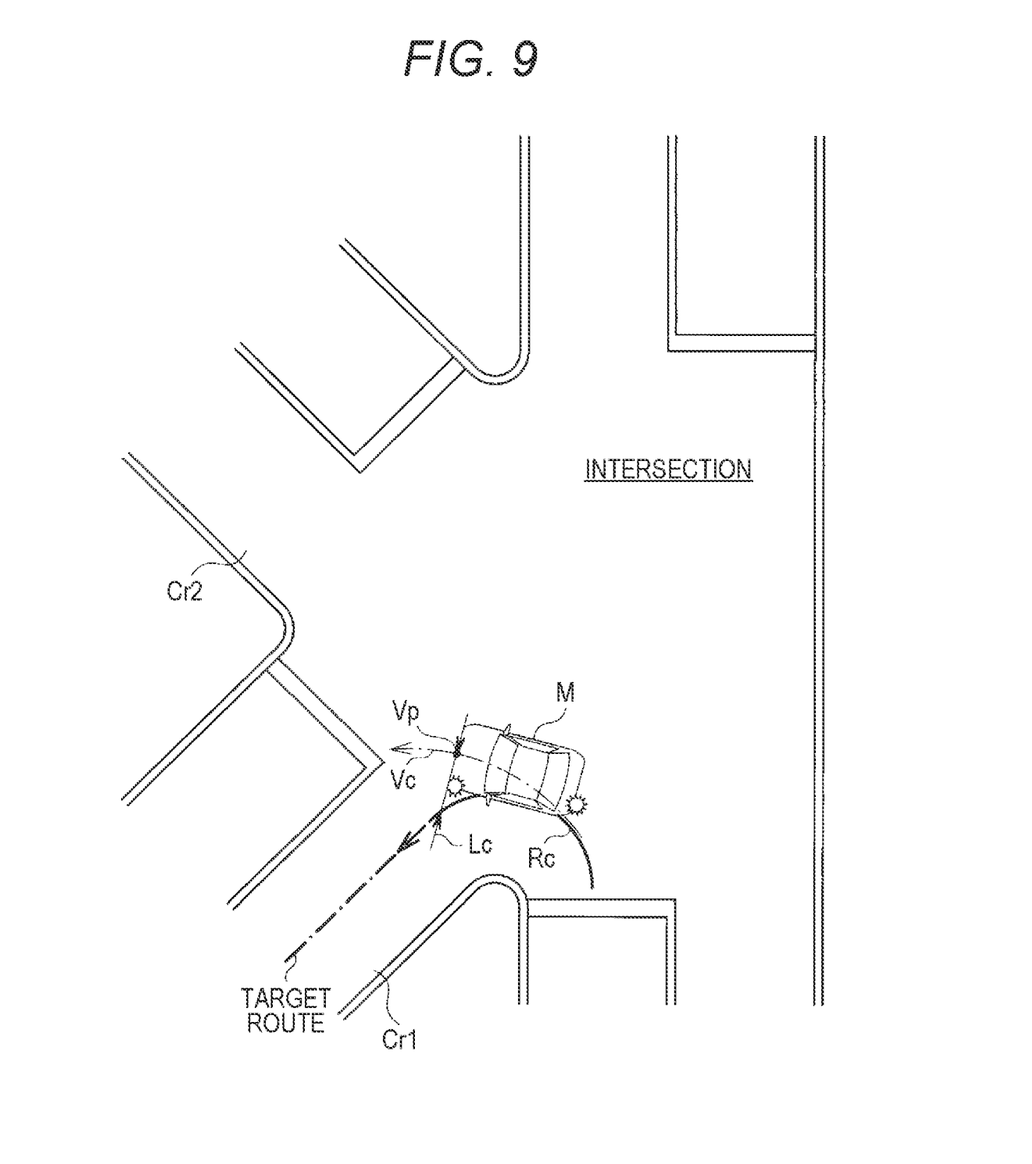
FIG. 9 is a diagram illustrating a behavior of a vehicle when the vehicle turns left at an intersection of multiple intersecting roads.

Next, the process proceeds to step S33, and based on the forward traveling environment information read in step S32, it is checked whether the vehicle M has passed through the intersection. Then, when the vehicle is traveling in the intersection, the process proceeds to step S34. On the other hand, when the vehicle has passed through the intersection, the routine is terminated. Note that, in the present embodiment, as illustrated in FIG. 9, a vehicle position Vp indicates the front end of the vehicle M and the center in the vehicle width direction, and the entrance and passage at the intersection are determined by the vehicle position Vp.

In step S34, the latest data of the correct route Rc and the quasi-correct route Rs stored in the nonvolatile memory is read and matched with the intersection of the high-precision road map (see FIG. 8). Next, the process proceeds to step S35, and the estimated traveling route Vc of the vehicle M in the intersection is generated based on the vehicle behavior. In one embodiment, the process in step S35 may serve as a process performed by an "estimated traveling route setter".

Figure 10:
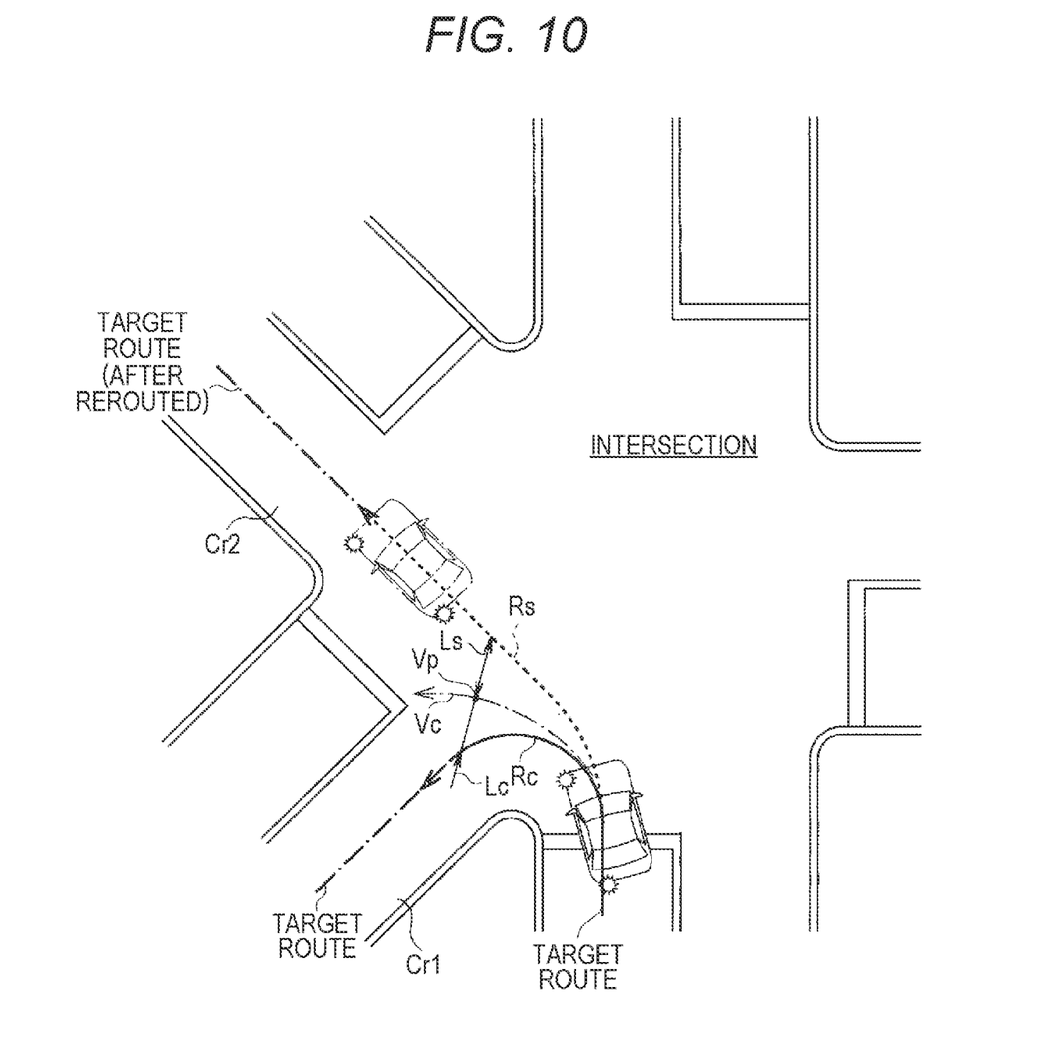
FIG. 10 is a diagram in a state in which a target route of the vehicle is set in a quasi-correct route direction.

This vehicle behavior is a temporal change in the steering angle detected by the steering angle sensor of the vehicle state sensor 15 or the yaw rate detected by the yaw rate sensor, and the estimated traveling route Vc when the vehicle M enters the intersection is generated from this temporal change (see FIG. 10). Thereafter, the process proceeds to step S36, and a lateral position distance (correct-route-side lateral position distance) Lc between the correct route Rc and the estimated traveling route Vc is calculated. Further, in step S37, a lateral position distance (quasi-correct-route-side lateral position distance) Ls between the quasi-correct route Rs on the intersection and the estimated traveling route Vc is calculated (see FIG. 10). In one embodiment, the process in steps S36 and S37 may serve as a process performed by a "lateral position distance calculator".

The driving assistance control unit 21 performs feedback control for correcting a lateral deviation amount with respect to the target route so that the vehicle M travels along the target route. However, at the time of turning when turning at the intersection, there is a limit to the steering of the vehicle M by electric power steering, and it may be difficult to cause the vehicle M to travel along the target route.

For example, as illustrated in FIG. 9, when the curvature of the correct route Rc generated in the turning direction (left turning direction in the drawing) in the intersection is large, it may be difficult to return to the correct route Rc direction by normal feedback control. Consequently, the correct-route-side lateral position distance Lc between the correct route Rc and the estimated traveling route Vc gradually increases, the vehicle enters the opposite lane direction, and convergence to the target route to the lane in the turning direction (left turning direction in the drawing) deteriorates.

Accordingly, in the next steps S38 to S40, it is determined whether the estimated traveling route Vc can converge to the target route at the turning destination. First, in step S38, the correct-route-side lateral position distance Lc and the quasi-correct-route-side lateral position distance Ls are compared.

Then, when Lc≤Ls, it is determined that the vehicle M travels from the correct route Rc to the target route direction and can converge to the target route by the feedback control, and the routine is terminated. On the other hand, when Lc>Ls, it is determined that the vehicle M is closer to the quasi-correct route Rs, and the process proceeds to step S39.

Incidentally, as illustrated in FIG. 10, the correct-route-side lateral position distance Lc and the quasi-correct-route-side lateral position distance Ls gradually change as the vehicle moves from the end point in front of the intersection to the end point side of the intersection exit. In step S38, the correct-route-side lateral position distance Lc and the quasi-correct-route-side lateral position distance Ls are constantly compared from the time of entering the intersection, and the routine is terminated when Lc≤Ls is satisfied by first intervention control or second intervention control to be described later.

Figure 7:
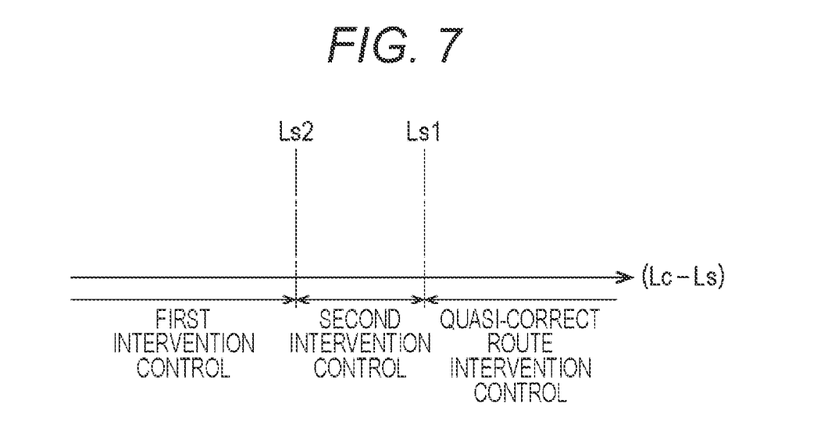
FIG. 7 is a conceptual diagram illustrating intervention control division.

Proceeding to step S39, in this step S39 and S40, a difference (Lc−Ls) between the correct-route-side lateral position distance Lc and the quasi-correct-route-side lateral position distance Ls is compared with a first threshold value Ls1, and a second threshold value Ls2 to determine how close the correct-route-side lateral position distance Lc is to the quasi-correct-route-side lateral position distance Ls. The first threshold value Ls1 and the second threshold value Ls2 are fixed values obtained in advance from an experiment or the like, and have a relationship of Ls1>Ls2 (see FIG. 7).

Here, the first threshold value Ls1 is a value slightly lower than a limit value at which the vehicle M can be guided to the target route direction by the second intervention control to be described later, and is set in advance by obtaining from an experiment or the like. In addition, the second threshold value Ls2 is a value slightly lower than a limit value at which the vehicle M can be guided to the target route direction by the first intervention control weaker than the second intervention control to be described later, and is set in advance by obtaining from an experiment or the like.

In step S39, the difference (Lc−Ls) is compared with the first threshold value Ls1, and when (Lc−Ls)≤Ls1, the driving assistance control unit 21 determines that the vehicle M can be guided to the target route by the intervention control, and proceeds to step S40. On the other hand, when (Lc−Ls)>Ls1, the driving assistance control unit 21 determines that it is difficult to guide the vehicle M to the target route, branches to step S43, executes the quasi-correct route intervention control, and terminates the routine. In one embodiment, the process in step S39 may serve as a process performed by a "lateral position distance comparator". In addition, the quasi-correct route intervention control will be described later.

In step S40, the difference (Lc−Ls) is compared with the second threshold value Ls2. Then, when (Lc−Ls)≤Ls2, the process proceeds to step S41, and the first intervention control is executed and the routine is terminated. On the other hand, when (Lc−Ls)>Ls2, the process branches to step S42, the second intervention control is executed, and the routine is terminated.

In the first intervention control executed by the driving assistance control unit 21 in step S41, first, the notification device 34 is activated to notify the driver of forced intervention of the control. Next, a loose (weak) brake driving signal is transmitted to the brake driving unit 31, and a steering signal is transmitted to the EPS driving unit 32. Then, the traveling direction of the vehicle M is corrected to the target route direction while decelerating in the intersection.

In addition, in the second intervention control executed by the driving assistance control unit 21 in step S42, first, the notification device 34 is activated to notify the driver that forced intervention of the control is executed. Next, a stronger brake driving signal is transmitted to the brake driving unit 31, and the steering signal is transmitted to the EPS driving unit 32.

Consequently, the traveling direction of the vehicle M is corrected to the target route direction while greatly decelerating in the intersection, and the vehicle M is prevented from entering the opposite lane side in the intersection.

Figure 6:
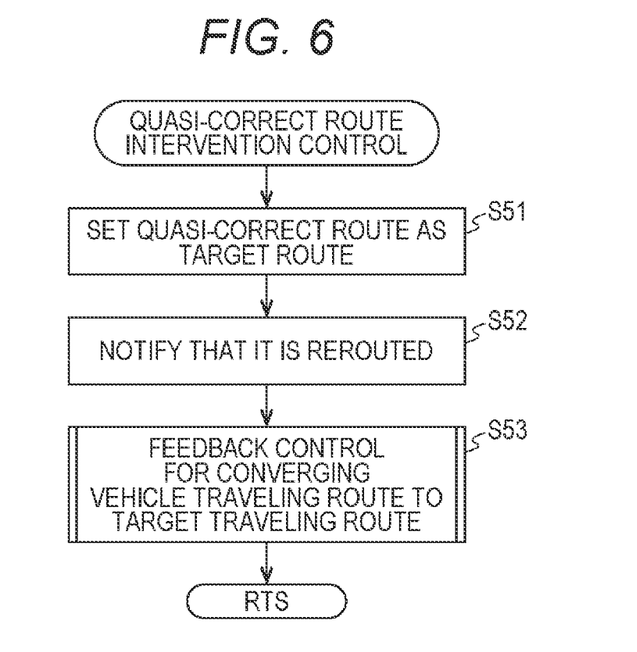
FIG. 6 is a flowchart illustrating a quasi-correct route intervention control subroutine.

Further, the quasi-correct route intervention control executed in step S43 is processed according to a quasi-correct route intervention control subroutine illustrated in FIG. 6. In one embodiment, the process in this step may serve as a process performed by an "intervention controller".

In this subroutine, first, in step S51, the quasi-correct route Rs is set as the target route. That is, an instruction to set the vehicle traveling route as the quasi-correct route Rs is transmitted from the driving assistance control unit 21 to the travel route/target route setting calculator 12b of the map locator calculator 12. Then, the travel route/target route setting calculator 12b reroutes the travel route to the travel lane side of the second intersecting road Cr2 coupled to the quasi-correct route, and sets a new target route in the travel lane.

Next, the processing proceeds to step S52, and the notification device 34 is activated to notify the driver that the traveling direction of the vehicle M has been rerouted. Thereafter, the process proceeds to step S53, and the driving assistance control unit 21 executes feedback control for converging the vehicle M to a newly set target route (quasi-correct route Rs) in the intersection, and terminates the routine.

As described above, when the vehicle M turns (right turn or left turn) at an intersection by automated driving, when the turning direction in the intersection is multiple intersecting roads, the driving assistance control unit 21 of the present embodiment generates the correct route Rc coupled to the first intersecting road Cr1 to which the vehicle is about to turn, and generates the quasi-correct route Rs coupled to the adjacent second intersecting road Cr2 in the intersection.

Next, the estimated traveling route Vc in the intersection is set from the behavior of the vehicle M before entering the intersection. Then, the lateral position distances Lc and Ls from the estimated traveling route Vc to the correct route Rc and the quasi-correct route Rs are obtained, and when the correct-route-side lateral position distance Lc is longer than the quasi-correct-route-side lateral position distance Ls (Lc>Ls) and the difference (Lc−Ls) thereof is longer than the first threshold value Ls1 ((Lc−Ls)>Ls1), the target route is switched to the quasi-correct route Rs side. Then, the travel route/target route setting calculator 12b reroutes the traveling route in a lane direction coupled to the quasi-correct route, and sets a new target route.

As described above, according to the present embodiment, when it is predicted that the vehicle M cannot make the turn in the direction of the first intersecting road Cr1 when the vehicle M actually enters the intersection, the target route is switched to the quasi-correct route Rs set in the direction of the adjacent second intersecting road Cr2. Thus, when the vehicle M enters the intersection, it is possible to safely guide the vehicle M to the second intersecting road Cr2 by appropriate intervention control corresponding to the estimated traveling route Vc without forcibly turning the vehicle M in the direction of the first intersecting road Cr1.

Note that the disclosure is not limited to the above-described embodiment, and for example, the driving assistance control unit 21 can also be applied to a case where only steering assistance at the time of traveling is performed.

According to the disclosure, when it is determined that the vehicle turns right or left at an intersection ahead, it is checked whether there is a second intersecting road adjacent to a first intersecting road of a destination of turning right or left; when it is determined that there is the second intersecting road; a correct route coupled to the target route generated in the first intersecting road and a quasi-correct route coupled to the second intersecting road are generated at the intersection before the vehicle enters the intersection; an estimated traveling route of the vehicle is set in the intersection from a behavior of the vehicle; a correct-route-side lateral position distance from the estimated traveling route to the correct route in a vehicle width direction and a quasi-correct-route-side lateral position distance from the estimated traveling route to the quasi-correct route are calculated; and when it is determined that the correct-route-side lateral position distance is longer than the quasi-correct-route-side lateral position distance by a predetermined distance or more, a traveling direction of the vehicle is set to a side of the quasi-correct route, and thus it is possible to perform appropriate intervention control depending on the estimated traveling route in the intersection.

The invention claimed is:

1. A driving assistance apparatus for a vehicle, the driving assistance apparatus comprising:
    an environment information acquisitor configured to acquire environment information in front of the vehicle;
    a target route setter configured to set a target route of the vehicle; and
    a controller configured to cause the vehicle to travel along the target route, wherein
    the controller comprises:
    an intersection determiner configured to determine whether there is an intersection in front of the vehicle based on the environment information;
    a right-left turn determiner configured to, when the intersection determiner determines that there is the intersection, determine whether the vehicle turns right or left at the intersection;
    a multiple intersecting road determiner configured to, when the right-left turn determiner determines that the vehicle turns right or left, check whether there is a second intersecting road adjacent to a first intersecting road to which the vehicle turns right or left;
    a route generator configured to, when the multiple intersecting road determiner determines that there is the second intersecting road, generate a correct route and a quasi-correct route at the intersection before the vehicle enters the intersection, the correct route being coupled to the target route generated in the first intersecting road, the quasi-correct route being coupled to the second intersecting road;
    an estimated traveling route setter configured to set an estimated traveling route of the vehicle in the intersection based on a behavior of the vehicle;
    a lateral position distance calculator configured to calculate a correct-route-side lateral position distance from the estimated traveling route to the correct route in a vehicle width direction of the vehicle and a quasi-correct-route-side lateral position distance from the estimated traveling route to the quasi-correct route in the vehicle width direction;

a lateral position distance comparator configured to compare the correct-route-side lateral position distance and the quasi-correct-route-side lateral position distance; and an intervention controller configured to, when the lateral position distance comparator determines that the correct-route-side lateral position distance is longer than the quasi-correct-route-side lateral position distance by a predetermined distance or more, set a traveling direction of the vehicle to a side of the quasi-correct route.

2. The driving assistance apparatus for the vehicle according to claim 1, wherein the route generator is configured to generate the correct route with a curvature between two points coupling an end point at which the vehicle faces the intersection and an end point at which the target route generated in the first intersecting road faces the intersection.

3. The driving assistance apparatus for the vehicle according to claim 1, wherein the route generator is configured to generate the quasi-correct route with a curvature between two points coupling an end point at which the vehicle faces the intersection and a line extending toward the intersection at a center of a lane width of the second intersecting road.

4. The driving assistance apparatus for the vehicle according to claim 2, wherein the route generator is configured to generate the quasi-correct route with a curvature between two points coupling the end point at which the vehicle faces the intersection and a line extending toward the intersection at a center of a lane width of the second intersecting road.

5. The driving assistance apparatus for the vehicle according to claim 1, wherein the target route setter is configured to set the target route in a direction of the second intersecting road when the intervention controller sets the traveling direction of the vehicle to the side of the quasi-correct route.

6. The driving assistance apparatus for the vehicle according to claim 1, wherein the estimated traveling route indicates a center of the vehicle in the vehicle width direction.

7. A driving assistance apparatus for a vehicle, the driving assistance apparatus comprising circuitry configured to:

acquire environment information in front of the vehicle;

set a target route of the vehicle and cause the vehicle to travel along the set target route;

determine whether there is an intersection in front of the vehicle based on the acquired environment information;

upon determining that there is the intersection, determine whether the vehicle turns right or left at the intersection;

upon determining that the vehicle turns right or left, check whether there is a second intersecting road adjacent to a first intersecting road to which the vehicle turns right or left;

upon determining that there is the second intersecting road, generate a correct route and a quasi-correct route at the intersection before the vehicle enters the intersection, the correct route being coupled to the target route generated in the first intersecting road, the quasi-correct route being coupled to the second intersecting road;

set an estimated traveling route of the vehicle in the intersection based on a behavior of the vehicle;

calculate a correct-route-side lateral position distance from the estimated traveling route to the correct route in a vehicle width direction of the vehicle and a quasi-correct-route-side lateral position distance from the estimated traveling route to the quasi-correct route in the vehicle width direction;

compare the correct-route-side lateral position distance and the quasi-correct-route-side lateral position distance; and upon determining that the correct-route-side lateral position distance is longer than the quasi-correct-route-side lateral position distance by a predetermined distance or more, set a traveling direction of the vehicle to a side of the quasi-correct route.

* * * * *